(12) United States Patent
Kitajima et al.

(10) Patent No.: US 6,279,423 B1
(45) Date of Patent: Aug. 28, 2001

(54) COUNTERSHAFT TRANSMISSION

(75) Inventors: Kyoji Kitajima; Hideo Udou; Masakazu Mitani, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,791

(22) Filed: Feb. 22, 2000

(30) Foreign Application Priority Data

Feb. 22, 1999 (JP) .................................................. 11-042841

(51) Int. Cl.⁷ ..................................................... F16H 57/02
(52) U.S. Cl. ............................................................ 74/606 R
(58) Field of Search .................................. 74/606 R, 333

(56) References Cited

U.S. PATENT DOCUMENTS

| 5,884,525 | * | 3/1999 | Toyota et al. | ............................ | 74/325 |
| 5,946,971 | * | 9/1999 | Toyota et al. | ............................ | 74/331 |
| 6,109,393 | * | 8/2000 | Toyota et al. | ........................ | 184/6.12 |

FOREIGN PATENT DOCUMENTS 57-33264   2/1982 (JP) .
6-221432   8/1994 (JP) .

* cited by examiner

Primary Examiner—Dirk Wright
(74) Attorney, Agent, or Firm—Armstrong, Westerman, Hattori, McLeland & Naughton, LLP

(57) ABSTRACT

A transmission case comprises first, second and third casings 1, 2 and 3, which are connected side by side in this order from an engine. An input shaft 11 and a countershaft 12 with speed change gear trains and clutches are disposed in a first room 8 which is defined by the first and second casings, and the both ends of these shafts 11 and 12 are supported rotatably in partition walls 4 and 5 which are provided with the first and second casings, respectively. In this condition, the side of the countershaft 12 which is located away from the engine extends into a second room 9 defined by the second and third casings, in which room, an output shaft 13 is disposed. In addition, a constant mesh type gear train is disposed in the second room 9 for power transmission between the countershaft 12 and the output shaft 13. Furthermore, the end of the output shaft 13 which is located toward the engine is supported rotatably by the second casing while the end of the countershaft 12 and the side of the output shaft 13 which are located away from the engine are supported rotatably by the third casing.

7 Claims, 8 Drawing Sheets

COUNTERSHAFT TRANSMISSION

BACKGROUND OF THE INVENTION

The present invention relates to a countershaft transmission in which a plurality of speed change gear trains are disposed in parallel with one another on parallel shafts, and a gear change is carried out by selectively activating one of the clutches provided to the gear trains.

1. Field of the Invention

Many countershaft type transmissions are used in automobiles, and an example of a countershaft transmission is disclosed in Japanese Laid-open Patent Publication No. H6(1994)-221432(A). Typically, a countershaft transmission comprises a plurality of constant mesh type speed change gear trains, which are disposed in parallel with one another between two parallel shafts, and each gear train is provided with a clutch, for example, a synchromesh-type clutch. These clutches are activated selectively in correspondence to the manipulation of the shift lever by the driver to achieve a power transmission at a desired speed ratio.

2. Description of the Related Art

There is an attempt to increase the number of speed change ratios or gear ratios available for such countershaft transmissions, in order to improve the driving characteristics of the vehicles which incorporate countershaft transmissions. With this attempt, the number of speed change gear trains which are disposed in parallel with one another between the two parallel shafts is also increasing. This trend may lead to a problem that the size of the transmission will increase to include the shafts which are formed longer than ever to support these gear trains, which are increasing in number. Therefore, not to elongate the shafts too much for the purpose of keeping the transmission compact, there is a demand for improvements in the arrangement and construction of the speed change gear trains.

In the production of a countershaft transmission, the relation of the two parallel shafts must be maintained while a plurality of speed change gear trains each including drive and driven gears to mesh with each other are being mounted on these shafts, together with a plurality of clutches which select the gear trains for power transmission. Therefore, there is a need for a countershaft transmission which facilitates easy and simple assembly.

SUMMARY OF THE INVENTION

It is an object of the present invention to provide a countershaft transmission which facilitates the assembly of two parallel shafts disposed with a plurality of speed change gear trains therebetween and a plurality of clutches in a transmission case.

The present invention provides a countershaft transmission which rotatably incorporates first, second and third shafts in a transmission case. The first shaft (e.g., the input shaft 11 of the embodiment described in the following section) is connected to an engine, the second shaft (e.g., the countershaft 12 of the following embodiment) extends in parallel with the first shaft, and the third shaft (e.g., the output shaft 13 of the following embodiment) extends in a direction away from the engine against the first shaft. In addition, a plurality of speed change gear trains (e.g., the LOW, SECOND, THIRD, FOURTH, FIFTH, SIXTH and REVERSE gear trains of the embodiment described in the following section) are disposed in parallel with one another between the first shaft and the second shaft. In this transmission, the transmission case comprises separate first, second and third casings, which are connected in this order from the side where the engine is placed. In a first room which is defined by the first and second casings, disposed are the first shaft, the second shaft and the speed change gear trains, and the sides of the first and second shafts which are located toward the engine are supported rotatably by the first casing while the side of the first shaft which is located away from the engine is supported rotatably by the second casing. In a second room which is defined by the second and third casings, disposed are the side of the second shaft which is located away from the engine, the third shaft, and the transmission means (e.g., the gear train 28a and 28b of the following embodiment), which carries out power transmission between the second and third shafts, and the side of the third shaft which is located toward the engine is supported rotatably by the second casing while the sides of the second and third shafts which are located away from the engine are supported rotatably by the third casing.

The countershaft transmission which is designed in the above described way can be assembled by following the next assembly stages. At first, the first casing is set with the side end which is to meet the engine facing downward and the first room opening upward. Into the inside space of this first casing, the first and second shafts which are subassembled with speed change gears and clutches, respectively, are inserted vertically from above, with the sides of the first and second shafts which are located toward the engine facing downward, and then the ends of the first and second shafts are supported rotatably by the first casing. As a result, the two shafts stand vertically in the first casing, and the speed change gear trains are disposed between these shafts. Then, the second casing is mounted on the first casing such that the second casing encloses the first and second shafts, and the side of the first shaft which is located away from the engine and a middle portion of the second shaft are supported rotatably by the second casing. By this stage, the transmission has been assembled with the first and second shafts, which are disposed in parallel with each other and supported rotatably in the room surrounded by the first and second casings, and with a plurality of speed change gear trains, which are disposed in parallel with one another between these two shafts.

In this condition of the transmission, which is assembled with the second casing, the side of the second shaft which is located away from the engine protrudes upward from the second casing. Now, a gear which constitutes the above mentioned transmission means or transmission gear train is mounted on this protruding second shaft, and the third shaft subassembled with the other gear which constitutes the transmission gear train is mounted with the side of the third shaft which is located toward the engine facing downward. The third shaft in this condition is supported rotatably by the part of the second casing which faces the above mentioned second room. Then, the third casing is mounted on the second casing such that the third casing covers the second and third shafts. By this stage, the transmission have been assembled with basic parts, and the part of the second shaft protruding from the second casing, the transmission gear train and the third shaft are disposed in the room surrounded by the second and third casing. In this way, the transmission according to the present invention enables an orderly assembly in which the transmission is assembled in the order of the first, second and third casings while the engine side of the transmission is set downward, with the first, second and third shafts standing upward. Therefore, the assembly of the transmission is easy and simple.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
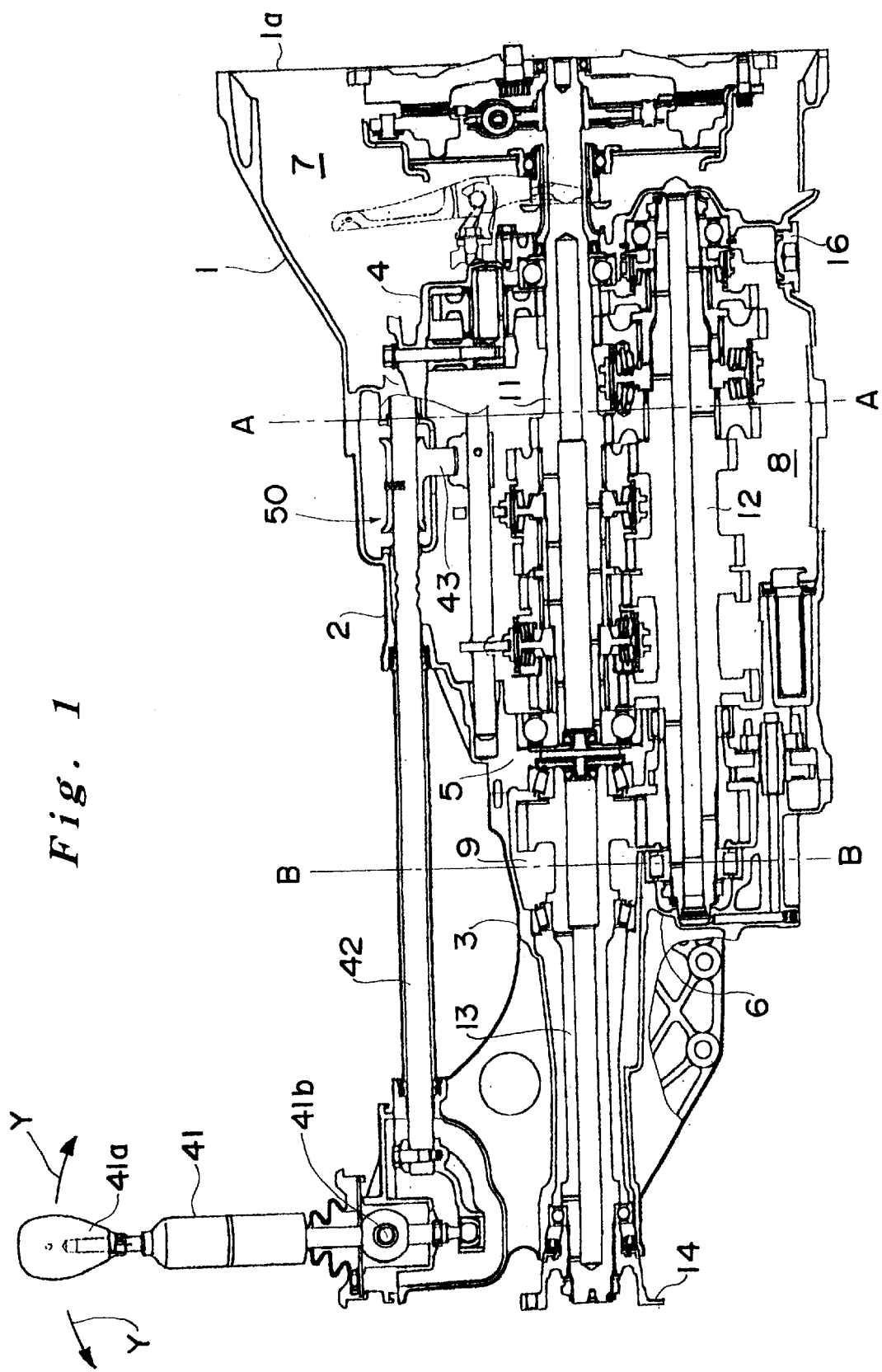
FIG. 1 is a sectional view showing the construction of a countershaft transmission according to the present invention.
Figure 2:
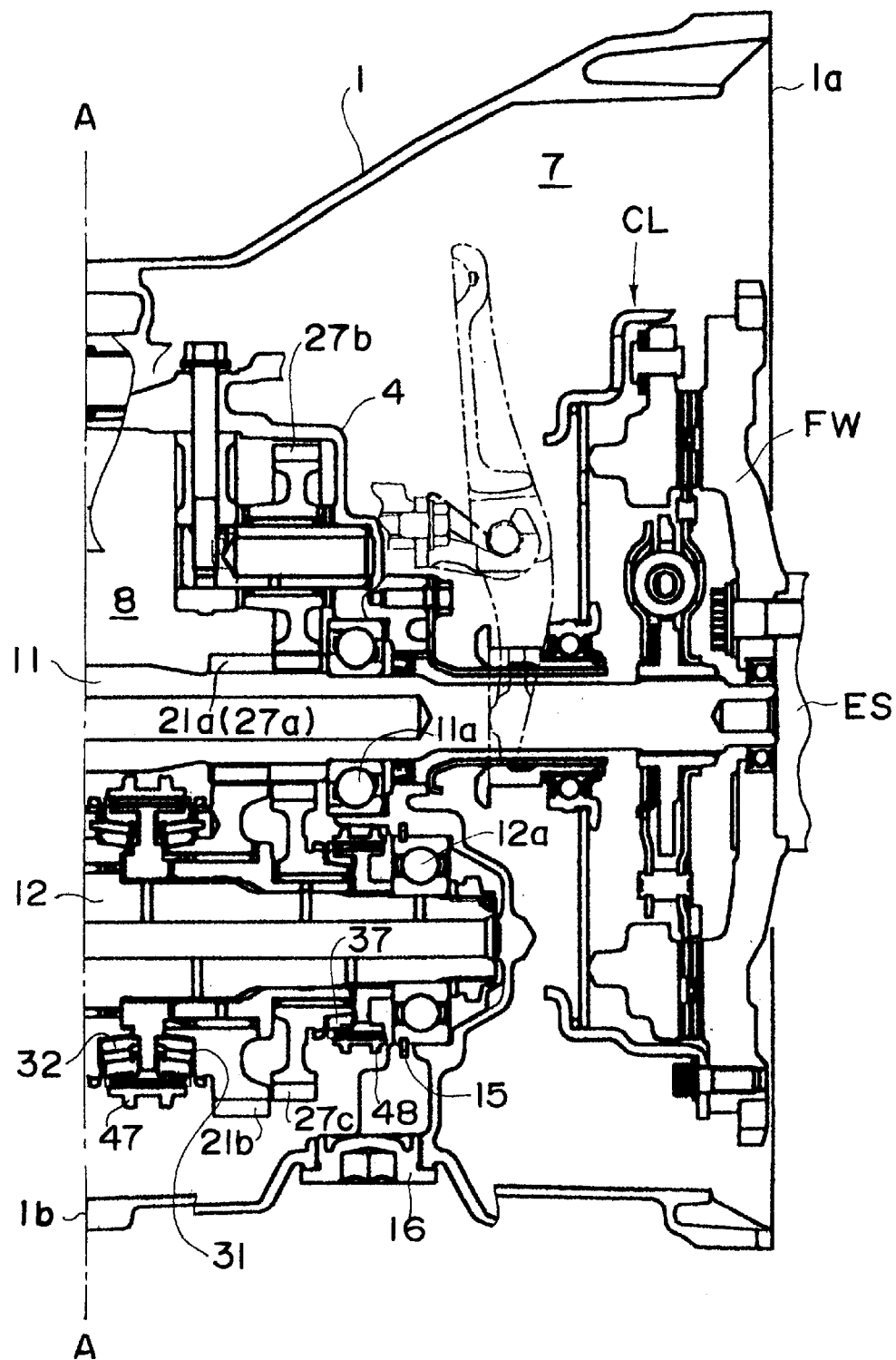
FIG. 2 is an enlarged sectional view showing the right side section of the countershaft transmission.
Figure 3:
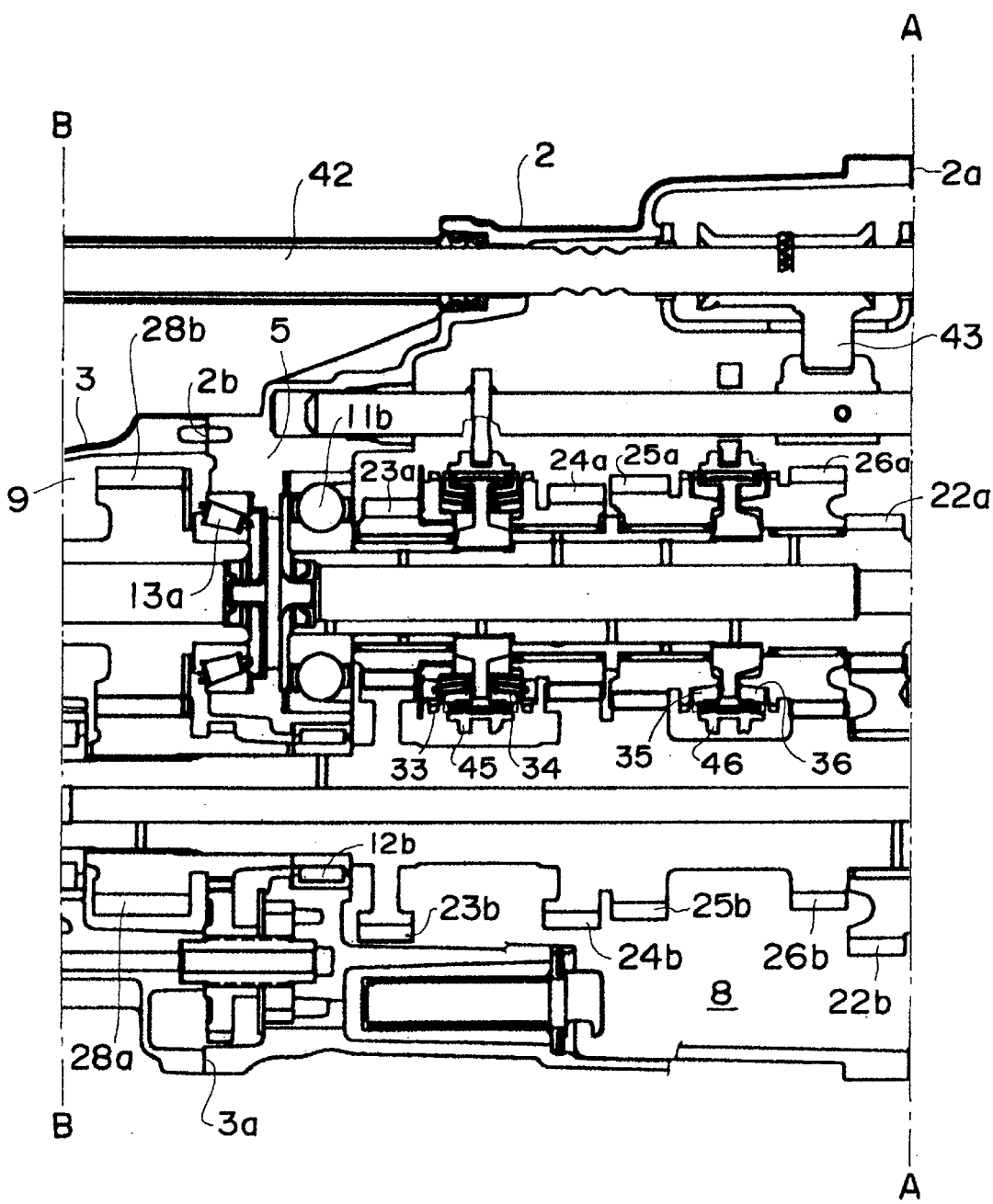
FIG. 3 is an enlarged sectional view showing the central section of the countershaft transmission.
Figure 4:
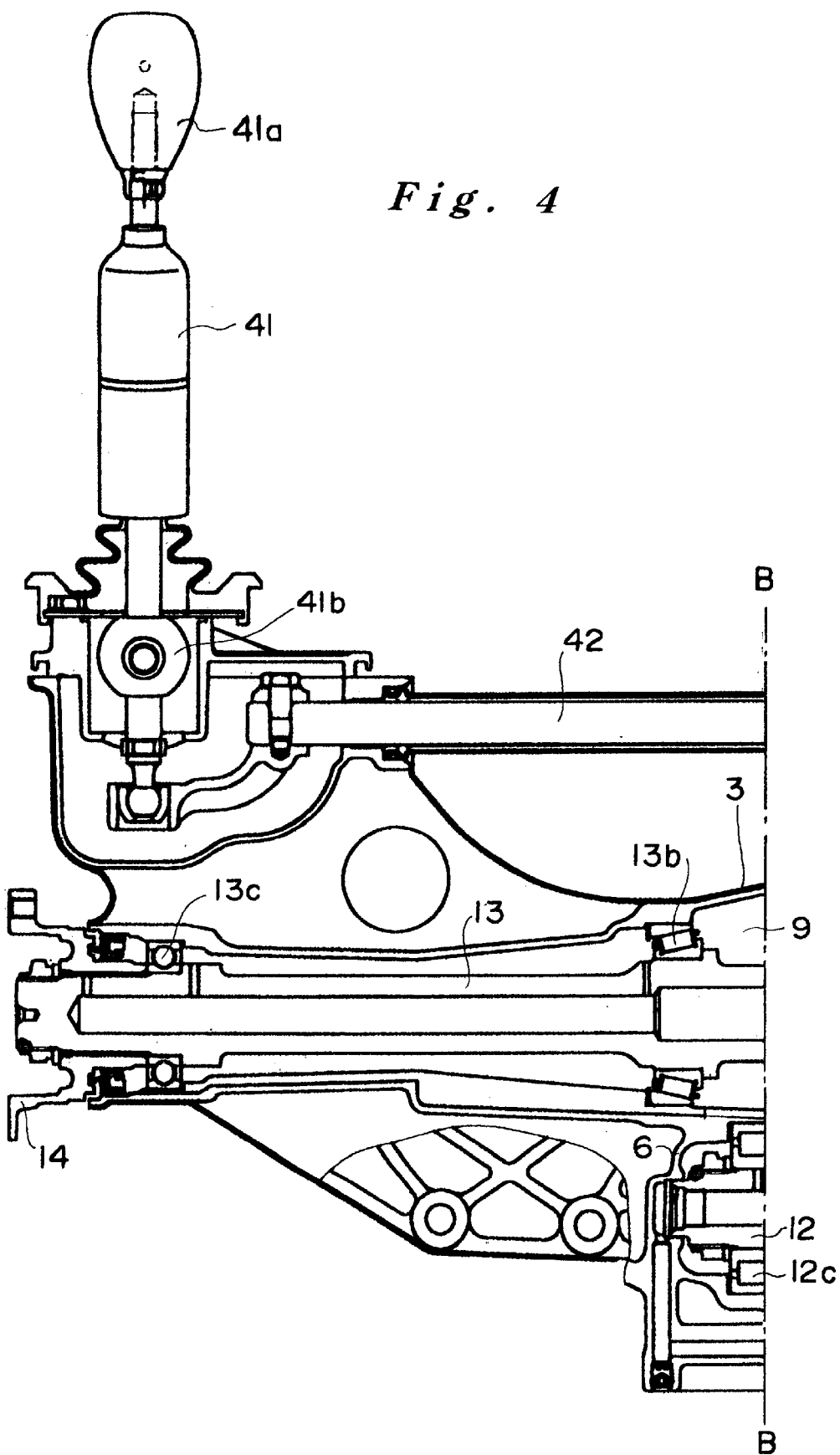
FIG. 4 is an enlarged sectional view showing the left side section of the countershaft transmission.

FIGS. 1, 2, 3 and 4 show the construction of a countershaft transmission according to the present invention. FIGS. 2, 3 and 4 are enlarged views of the respective three sections of the transmission divided by alternate long and short dash lines A—A and B—B in FIG. 1. In these drawings, hatching is intentionally not rendered to make the structure of the transmission more easily understandable.

In this transmission, a gearshift is disposed in a unified transmission case of first, second and third casings 1, 2 and 3, which are connected firmly consecutively from the side where an engine is placed. The first casing 1 includes a first partition wall 4, the second casing 2 includes a second partition wall 5, and the third casing 3 includes a cover wall 6 on the left side thereof, i.e., on the side opposite to the side where the engine is located. Furthermore, a main clutch CL is disposed in a clutch room 7 which is provided on the right side of the first partition wall 4, i.e., on the side toward the engine, and the right side end face 1a of the first casing 1 is connected to a casing which accommodates the engine. Furthermore, a flying wheel FW is provided in the clutch room 7 and is connected to the output shaft ES of the engine, and the above mentioned main clutch CL is mounted on the flying wheel FW.

The left side end face 1b of the first casing 1 is fixed with the right side end face 2a of the second casing 2, and a first room 8 is defined by the first partition wall 4 of the first casing 1 and the second partition wall 5 of the second casing 2. In this room, an input shaft (first shaft) 11 and a countershaft (second shaft) 12 are disposed parallel with each other, and a total of seven gear trains used for speed change are disposed between these two shafts.

The right side of the input shaft 11 is supported rotatably by a bearing 11a, which is retained in the first partition wall 4, and the input shaft 11 extends further rightward through the first partition wall 4 into the clutch room 7 and the right end thereof is connected to the main clutch CL, which connects and disconnects the power transmission from the engine output shaft ES to the input shaft 11. The left side of the input shaft 11 is also supported rotatably by a bearing 11b, which is retained in the second partition wall 5. On the other hand, the right end of the countershaft 12 is supported rotatably by a bearing 12a, which is retained in the first partition wall 4. The left side of the countershaft 12 is supported rotatably by a bearing 12b, which is retained in the second partition wall 5, and the countershaft 12 extends further leftward through the second partition wall 5. To retain the bearing 12a in the first partition wall 4, a snap ring 15 is provided around the bearing 12a, and to place and remove this snap ring 15, an opening is provided on the lower side of the first casing 1, with a cap 16 covering the opening.

The left side end face 2b of the second casing 2 is fixed with the right side end face 3a of the third casing 3, and a second room 9 is defined by the second partition wall 5 and the cover wall 6. The left side of the countershaft 12, which passes through the second partition wall 5 as described above, extends into the second room 9, and in parallel with this countershaft 12, an output shaft (third shaft) 13 is disposed in the second room 9. Between these two shafts 12 and 13, a gear train 28a and 28b is disposed, and the gears constituting this gear train are mounted on these shafts respectively and mesh with each other. The left end of the countershaft 12 is supported rotatably by a bearing 12c, which is retained in the cover wall 6. On the other hand, the right end of the output shaft 13 is supported rotatably by a bearing 13a, which is retained in the second partition wall 5. The central part and the left end of the output shaft 13 are supported also rotatably by bearings 13b and 13c, respectively, which are retained in the cover wall 6. More specifically, the left end of the output shaft 13 passes through the cover wall 6 and protrudes outward, and this protruding portion 14 is connected to a propeller shaft, which is then connected to drive wheels.

The above mentioned seven speed change gear trains, which are disposed parallel with one another between the input shaft 11 and the countershaft 12 in the first room 8, are a REVERSE gear train 27a, 27b and 27c, a LOW gear train 21a and 21b, a SECOND gear train 22a and 22b, a SIXTH gear train 26a and 26b, a FIFTH gear train 25a and 25b, a FOURTH gear train 24a and 24b, and a THIRD gear train 23a and 23b respectively from the right side in the axial direction.

The LOW and SECOND gear trains comprise drive gears 21a and 22a, which are fixed on the input shaft 11, and driven gears 21b and 22b, which are mounted rotatably on the countershaft 12 and mesh with the drive gears 21a and 22a, respectively. To connect and disconnect the driven gears 21b and 22b to and from the countershaft 12 rotationally, synchro-mesh LOW and SECOND clutches 31 and 32 are provided, respectively. The engagement and disengagement of these clutches 31 and 32 are carried out by shifting a LOW or SECOND synchro-sleeve 47 in the axial direction. The REVERSE gear train comprises a drive gear 27a, which is fixed on the input shaft 11, an idle gear 27b, which is supported rotatably on the first partition wall 4 and meshes with the drive gear 27a, and a driven gear 27c, which is mounted rotatably on the countershaft 12 and meshes with the idle gear 27b. To connect and disconnect the driven gear 27c to and from the countershaft 12 rotationally, a synchro-mesh REVERSE clutch 37 is provided there, and the engagement and disengagement of the clutch 37 is carried out by shifting a REVERSE synchro-sleeve 48 in the axial direction.

The THIRD, FOURTH, FIFTH and SIXTH gear trains, respectively, comprise drive gears 23a, 24a, 25a and 26a, which are mounted rotatably on the input shaft 11, and driven gears 23b, 24b, 25b and 26b, which are fixed on the countershaft 12 and mesh with the drive gears 23a~26a. To connect and disconnect the drive gears 23a~26a to and from the input shaft 11 rotationally, synchro-mesh THIRD, FOURTH, FIFTH and SIXTH clutches 33, 34, 35 and 36 are provided, respectively. The engagement and disengagement of these clutches 33~36 are carried out by shifting a THIRD or FOURTH synchro-sleeve 45 or a FIFTH or SIXTH synchro-sleeve 46 in the axial direction.

In this transmission, a gear change or a change of speed change ratio is carried out by selectively engaging one of the LOW, SECOND, THIRD, FOURTH, FIFTH, SIXTH and REVERSE clutches 31~37 to realize a power transmission through a corresponding speed change gear train. This gear change is performed by a driver who manipulates a shift lever 41, which is provided at the driver's seat. The mechanism to realize the shifting functions as follows.

The shift lever 41 is supported by a spherical joint 41b, so that it can swing right and left and back and forth. The driver grips a shift knob 41b, which is provided at the upper end of the shift lever 41, and moves it back and fourth (in "Y" direction, which is the direction indicated by arrows Y in FIG. 1) or right and left (in the direction perpendicular to the paper carrying FIG. 1, which direction is hereinafter designated as "X" direction). The movement of the shift lever 41 is conveyed to a main shift rod 42. The swing of the shift lever 41 in the X direction rotates the main shift rod 42 while the swing of the shift lever 41 in the Y direction transfers the main shift rod 42 in the axial direction (the right and left direction in the figure). A selector arm 43 is fixed on the other end of the main shift rod 42, and when the shift lever 41 is moved in the X direction, the front end of the selector arm 43 is led into the engaging groove of one of a plurality of shift pieces, which will be described below.

Figure 5:
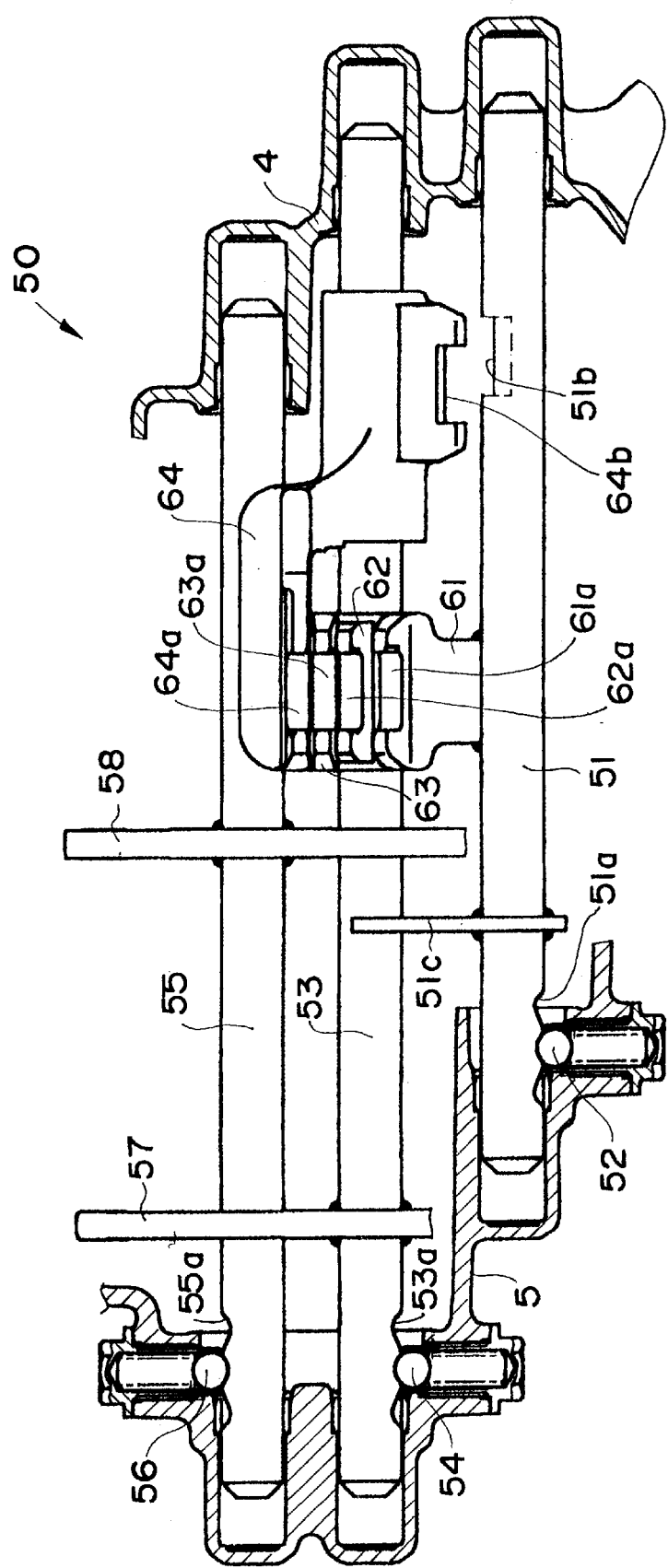
FIG. 5 is a sectional plan view showing a mechanism which conveys the shifting force in the transmission.
Figure 6:
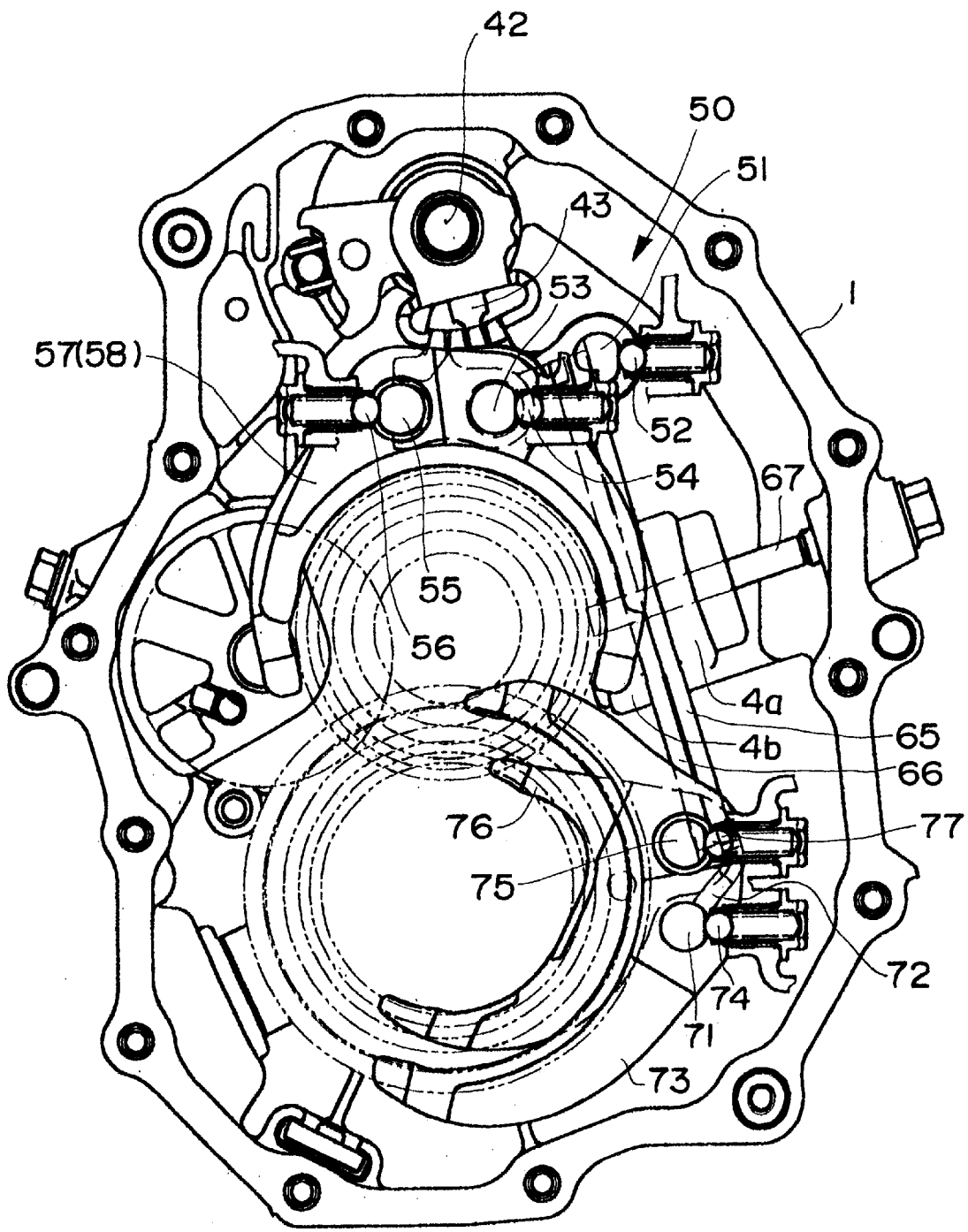
FIG. 6 is a sectional view of the transmission, taken toward the engine, showing the internal structure of the transmission including the above mentioned shifting force conveying mechanism.

FIG. 5 shows a mechanism 50 which includes these shift pieces and conveys the shifting force. Now, this shifting force conveying mechanism 50 is described with reference to FIG. 5 and FIG. 6. FIG. 6 is a view of the transmission without the second casing 2, being looked at toward the first casing 1, but it shows detent mechanisms 52, 54 and 56, which are provided in the second casing 2, to make the description more easily understandable.

The shifting force conveying mechanism 50 is located at the upper part of the first room 8, and it comprises a LOW or SECOND shift rod 51, a THIRD or FOURTH shift fork shaft 53 and a FIFTH or SIXTH shift fork shaft 55. The right ends of these shift rod and fork shafts are supported by the first partition wall 4 while the left ends are supported by the second partition wall 5, respectively, and they are movable in the axial direction. The LOW or SECOND shift rod 51 is provided with a whirl-stop 51c and detent furrows 51a, which are used in cooperation with a detent mechanism 52 for setting one of the following three positions: specifically, LOW, NEUTRAL and SECOND. In the same way, the THIRD or FOURTH shift fork shaft 53 and the FIFTH or SIXTH shift fork shaft 55 are provided with detent furrows 53a and 55a, respectively, which are used in cooperation with detent mechanisms 54 and 56, respectively, for setting one of the three positions: THIRD, NEUTRAL and FOURTH, and FIFTH, NEUTRAL and SIXTH, respectively.

In addition, the LOW or SECOND shift rod 51, the THIRD or FOURTH shift fork shaft 53 and the FIFTH or SIXTH shift fork shaft 55, respectively, are provided with a LOW or SECOND shift piece 61, a THIRD or FOURTH shift piece 62 and a FIFTH or SIXTH shift piece 63, which are fixed thereon. Furthermore, a REVERSE shift piece 64 is provided movably in the axial direction on the THIRD or FOURTH shift fork shaft 53. These shift pieces 61~64 include selector grooves 61a~64a, respectively, which are aligned laterally. The front end of the selector arm 43 is designed to engage one of the selector grooves 61a~64a. By moving the shift lever 41 in the X direction, the front end of the selector arm 43 is selectively engaged to one of the selector grooves 61a~64a, and by moving the shift lever 41 in the Y direction, the shift piece which has the selector groove engaged to the selector arm 43 is transferred in the axial direction.

The THIRD or FOURTH shift fork shaft 53 and the FIFTH or SIXTH shift fork shaft 55 are provided with a THIRD or FOURTH shift fork 57 and a FIFTH or SIXTH shift fork 58, respectively. The THIRD or FOURTH shift fork 57 is fixed on the THIRD or FOURTH shift fork shaft 53 and is axially slidable on the FIFTH or SIXTH shift fork shaft 55. On the other hand, the FIFTH or SIXTH shift fork 58 is fixed on the FIFTH or SIXTH shift fork shaft 55 and is axially slidable on the THIRD or FOURTH shift fork shaft 53. The THIRD or FOURTH shift fork 57 engages the THIRD or FOURTH synchro-sleeve 45, which activates the THIRD clutch 33 and the FOURTH clutch 34, while the FIFTH or SIXTH shift fork 58 engages the FIFTH or SIXTH synchro-sleeve 46, which activates the FIFTH clutch 35 and the SIXTH clutch 36. Therefore, by manipulating the shift lever 41, the selector arm 43 is engaged, for example, to the selector groove 62a or 63a of the THIRD or FOURTH shift piece 62 or the FIFTH or SIXTH shift piece 63, and then the THIRD or FOURTH shift fork shaft 53 or the FIFTH or SIXTH shift fork shaft 55 is transferred appropriately in the axial direction to selectively activate one of the THIRD~SIXTH clutches 33~36.

The LOW or SECOND synchro-sleeve 47, which activates the LOW and SECOND clutches 31 and 32, and the REVERSE synchro-sleeve 48, which activates the REVERSE clutch 37, are located on the countershaft 12 at the lower part of the transmission. Therefore, a LOW or SECOND shift fork 73 and a REVERSE shift fork 76, which engage these synchro-sleeves 47 and 48, are mounted, respectively, on a LOW or SECOND shift fork shaft 71 and a REVERSE shift fork shaft 75, which are provided movably in the axial direction at the lower part of the transmission. The LOW or SECOND shift fork 73 is fixed on the LOW or SECOND shift fork shaft 71 and is axially slidable on the REVERSE shift fork shaft 75 while the REVERSE shift fork 76 is fixed on the REVERSE shift fork shaft 75 and is axially slidable on the LOW or SECOND shift fork shaft 71.

When the LOW or SECOND shift fork shaft 71 or the REVERSE shift fork shaft 75 is transferred appropriately in the axial direction by manipulating the shift lever 41, the LOW or SECOND shift fork 73 or the REVERSE shift fork 76 moves correspondingly, and the LOW or SECOND synchro-sleeve 47 or the REVERSE synchro-sleeve 48 is transferred appropriately in the axial direction. As a result, one of the LOW, SECOND and REVERSE clutches 31, 32 and 37 can be selectively activated. In order to convey the force applied to the shift lever 41 to achieve the appropriate movement of the LOW or SECOND shift fork shaft 71 or the REVERSE shift fork shaft 75, a LOW or SECOND rocking lever 65 and a REVERSE rocking lever 66 are provided laterally in the first room 8 as detailed in FIGS. 6, 7 and 8.

These two rocking levers 65 and 66 are long plate-like members and positioned close to each other and are supported by a pair of retaining ribs 4a and 4b, which protrude from the first partition wall 4 into the first room 8. More specifically, an aperture is provided extending from the outer surface of the first casing 1 and passing through the retaining ribs 4a and 4b, and a retaining pin 67 is inserted from the outside of the casing into this aperture to support the rocking levers 65 and 66 at the center thereof as shown in FIG. 6. In this condition, each rocking lever is independently pivotable around the retaining pin 67. Because of this arrangement, the rocking levers 65 and 66 are easily mountable. They are placed between the retaining ribs 4a and 4b and then pinned with the retaining pin 67, which is inserted from the outside.

Figure 7:
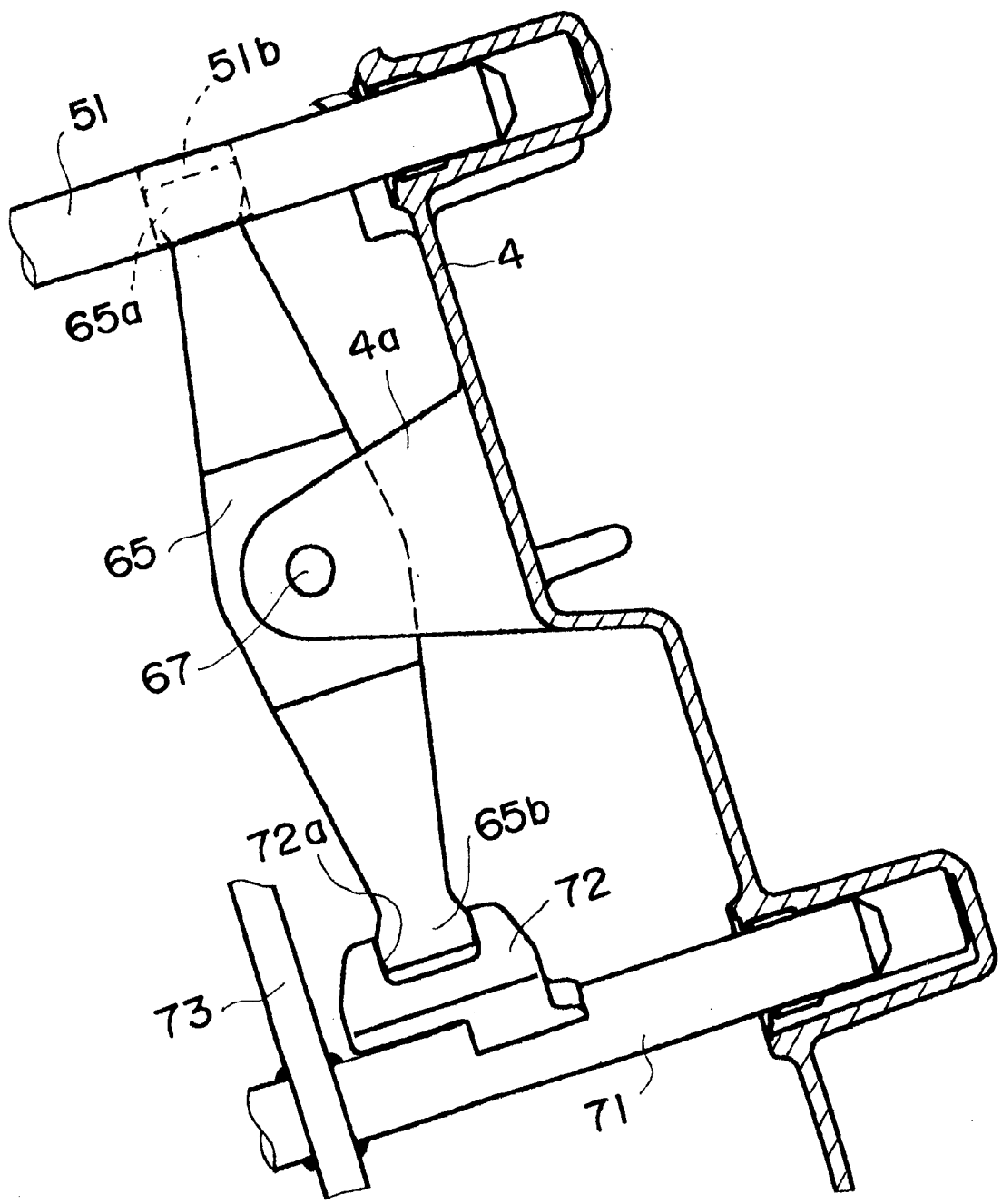
FIG. 7 is a sectional view showing the construction of a LOW or SECOND rocking lever, which constitutes a linkage conveying a shifting force.

As shown in FIG. 7, the upper end 65a of the LOW or SECOND rocking lever 65 is set in a recess 51b which is provided on the LOW or SECOND shift rod 51 while the lower end 65b is set in an engaging groove 72a which is provided on an engaging member 72 fixed on the LOW or SECOND shift fork shaft 71. In this construction, when the LOW or SECOND shift rod 51 is transferred in the axial direction by manipulating the shift lever 41, the LOW or SECOND shift fork shaft 71 is transferred in the opposite axial direction by the movement of the LOW or SECOND rocking lever 65, which movement is caused by the movement of the LOW or SECOND shift rod 51. As a result, the LOW or SECOND synchro-sleeve 47 is shifted in the axial direction correspondingly by the LOW or SECOND shift fork 73, which is fixed on the LOW or SECOND shift fork shaft 71. Thus, the LOW or SECOND clutch 31 or 32 can be activated selectively.

Figure 8:
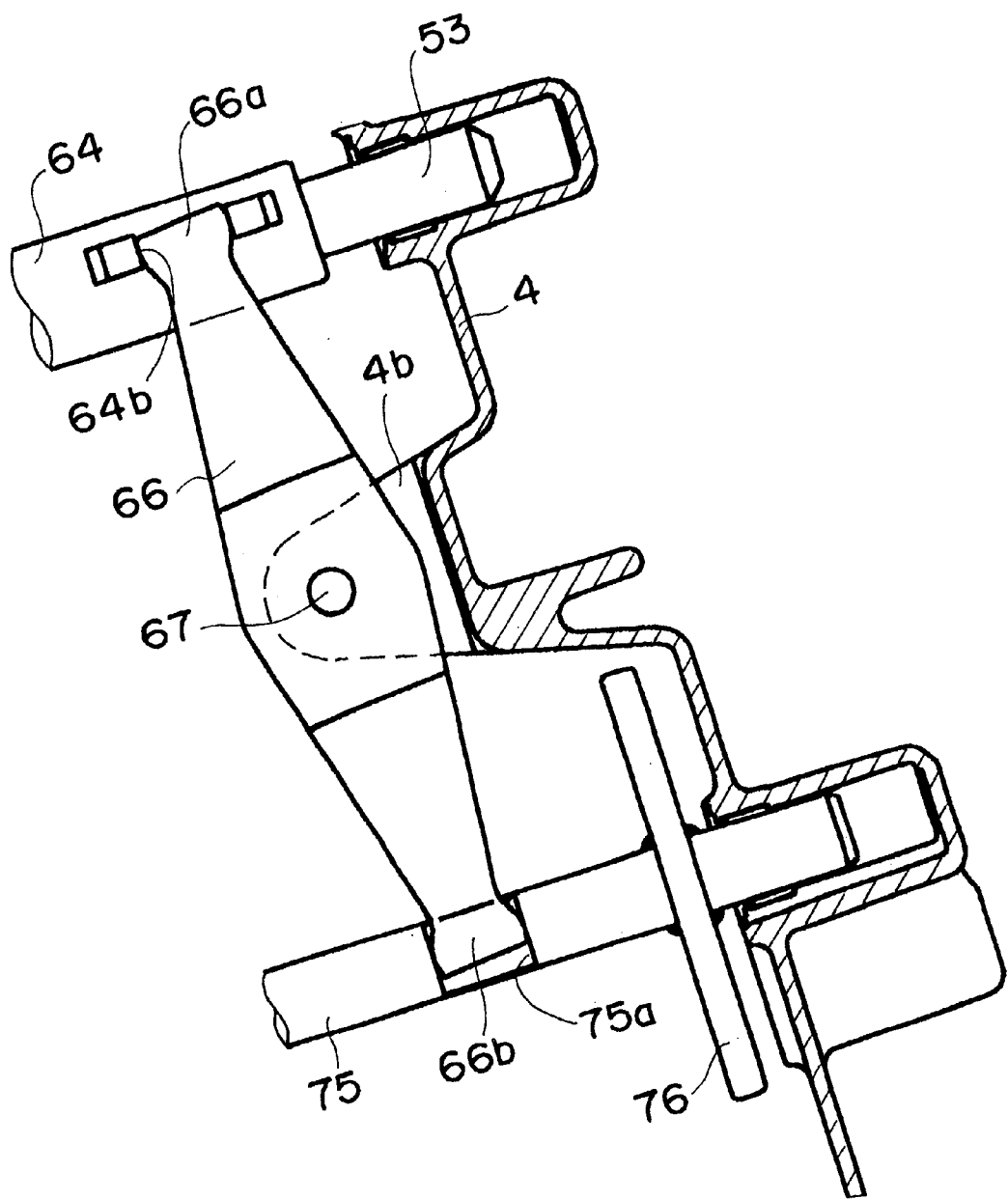
FIG. 8 is a sectional view showing the construction of a REVERSE rocking lever, which constitutes a linkage conveying a shifting force.

As shown in FIG. 8, the upper end 66a of the REVERSE rocking lever 66 is set in an engaging groove 64b which is provided in the REVERSE shift piece 64 while the lower end 66b is set in a recess 75a which is provided on the REVERSE shift fork shaft 75. In this condition, when the REVERSE shift piece 64 is transferred in the axial direction on the THIRD or FOURTH shift fork shaft 53, the REVERSE shift fork shaft 75 is transferred in the opposite axial direction by the movement of the REVERSE rocking lever 66, which is caused by the transfer of the REVERSE shift piece 64. As a result, the REVERSE synchro-sleeve 48 is shifted in the axial direction correspondingly by the REVERSE shift fork 76, which is fixed on the REVERSE shift fork shaft 75, to activate the REVERSE clutch 37.

Now, the process of assembling the countershaft transmission is described. In the assembly of the transmission, at first, the first casing 1 is placed with the end face 1a which meet the casing of the engine, facing downward, and with the first room 8 opening upward. In this condition, the input shaft 11 and the countershaft 12 with the speed change gear trains, clutches, etc. subassembled, respectively, are oriented vertically and put into the first room 8 from above, and these shafts are mounted in the first partition wall 4, with the bearings 11a and 12a which support the shafts rotatably. As a result, the right ends of the input shaft 11 and the countershaft 12 shown in FIG. 1 are supported by the bearings 11a and 12a at the predetermined positions in the first partition wall 4, and, at this stage of the assembly, the input shaft 11 and the countershaft 12 stand upward in the first casing 1. In this condition, the drive and driven gears which constitutes each gear train mesh with each other.

In the next stage of the assembly, the second casing 2 is mounted on the first casing 1 to enclose the input shaft 11 and the countershaft 12, which are protruding upward from the first casing 1. As a result, the left ends and the middle portions of these shafts 11 and 12 shown in FIG. 1 are supported rotatably with bearings 11b and 12b in the second partition wall 5, and the input shaft 11 and the countershaft 12 are rotatable in the first room 8.

In this condition, where the left end of the countershaft 12 shown in FIG. 1 protrudes upward from the second casing 2 through the second partition wall 5, a drive gear 28a and a bearing 12c are mounted on the countershaft 12. Then, the output shaft 13 with a driven gear 28b is put into the second casing 2, with the right end of the output shaft 13 shown in FIG. 1 being oriented downward. As a result, the output shaft 13, which stand vertically at this assembly stage, is supported rotatably with a bearing 13a in the second partition wall 5. Then, the third casing 3 is mounted on the second casing 2 to enclose the countershaft 12 and the output shaft 13, which are protruding upward.

According to the present invention, the above countershaft transmission is assembled first by setting the first casing 1 with its end face 1a which meets the casing of the engine, facing downward, and then by mounting the second casing 2 and the third casing 3 in this order as described above. In all the stages of the assembly, the input shaft 11, the countershaft 12 and the output shaft 13 are maintained in the respective casings, standing upward. Therefore, there is no need of jigs, which otherwise be needed to retain these shafts in the assembly, so the assembly operation is carried out simply and easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.11-042841 filed on Feb. 22, 1999, which is incorporated herein by reference.

What is claimed is:

1. A countershaft transmission which incorporates rotatably in a transmission case, a first shaft, which is connected to an engine, a second shaft, which extends in parallel with said first shaft, a third shaft, which extends in a direction away from said engine against said first shaft, and a plurality of speed change gear trains, which are disposed between said first shaft and said second shaft;

wherein:
said transmission case comprises a first casing, a second casing and a third casing, which are connected in this order from a side where said engine is placed;
said first shaft, said second shaft and said speed change gear trains are disposed in a first room which is defined by said first and second casings;
sides of said first and second shafts which are located toward said engine are rotatably supported by said first casing while a side of said first shaft which is located away from said engine is supported rotatably by said second casing;

a side of said second shaft which is located away from said engine, said third shaft, and transmission means, which carries out power transmission between said second and third shafts, are disposed in a second room which is defined by said second and third casings;

a side of said third shaft which is located toward said engine is rotatably supported by said second casing while sides of said second and third shafts which are located away from said engine are supported rotatably by said third casing; and the side of said first shaft which is located away from said engine and the side of said third shaft which is located toward said engine are separately supported by said second casing.

2. The countershaft transmission as set forth in claim 1, wherein:

said second shaft passes through said second casing and extends into said second room; and a middle portion of said second shaft is rotatably supported by said second casing.

3. The countershaft transmission as set forth in claim 1, wherein:

said third shaft is disposed axially in the same direction as said first shaft in said transmission case.

4. The countershaft transmission as set forth in claim 1, further comprising a main clutch, which is disposed in a clutch room defined by said first casing, which includes a first partition wall, and said engine, which is connected to a side end of said first casing;

wherein:

said side of said first shaft which is located toward said engine is rotatably supported by said first partition wall, said side of said first shaft passing through said first partition wall and extending into said clutch room; and said first shaft is rotationally connected through said main clutch to an output shaft of said engine.

5. The countershaft transmission as set forth in claim 1, wherein:

said first casings includes a first partition wall, said first partition wall rotatably supporting said sides of said first and second shafts which are located toward said engine;

said second casing includes a second partition wall, said second partition wall rotatably supporting said side of said first shaft which is located away from said engine and said side of said third shaft which is located toward said engine with said sides of said first and third shafts facing each other, and said second partition wall also rotatably supporting a middle portion of said second shaft which extends through said second partition wall; and said third casing includes a cover wall, said cover wall rotatably supporting said sides of said second and third shafts which are located away from said engine.

6. A method of assembling the countershaft transmission as set forth in claim 1, comprising the steps of:

setting said first casing such that a side end which meets said engine faces downward with said first room opening upward;

inserting, vertically from above into said first room, said first and second shafts which are subassembled with speed change gears and clutches, respectively;

supporting said first and second shafts vertically and rotatably by said first casing; and meshing a drive gear with a driven gear for each speed change gear train.

7. The method of assembling the countershaft transmission as set forth in claim 6, further comprising the steps of:

mounting said second casing on said first casing such that said second casing encloses said first and second shafts, which protrude upward from said first casing as mentioned in claim 6;

supporting the side of said first shaft which is located away from said engine and a middle portion of said second shaft rotatably by said second casing;

mounting a drive gear which constitutes said transmission means on said second shaft, which protrudes upward through said second casing;

mounting and supporting vertically and rotatably in said second casing said third shaft subassembled with a driven gear which constitutes said transmission means, with said side of said third shaft which is located toward said engine facing downward; and mounting said third casing on said second casing such that said third casing covers said second and third shafts, which protrude upward from said second casing.

* * * * *